Feb. 23, 1971 L. W. LESSLER 3,565,518
AUDIO-VISUAL PRESENTATION APPARATUS
Filed Nov. 18, 1968 4 Sheets-Sheet 1

INVENTOR
LEW W. LESSLER
BY Frederick E Bartholy
ATTORNEY

INVENTOR
LEW W. LESSLER
BY Frederick W Bartlett
ATTORNEY

INVENTOR
LEW W. LESSLER

Feb. 23, 1971    L. W. LESSLER    3,565,518
AUDIO-VISUAL PRESENTATION APPARATUS
Filed Nov. 18, 1968

INVENTOR
LEW W. LESSLER

BY *Frederick E. Bartholy*

ATTORNEY

United States Patent Office

3,565,518
Patented Feb. 23, 1971

3,565,518
AUDIO-VISUAL PRESENTATION APPARATUS
Lew W. Lessler, 25 Chadwick Road,
Binghamton, N.Y. 13903
Filed Nov. 18, 1968, Ser. No. 776,711
Int. Cl. G03b 31/04
U.S. Cl. 352—32             4 Claims

ABSTRACT OF THE DISCLOSURE

A disc-sound reproducer and motion picture projector combined into one compact unit is disclosed which employs a particular disc-film cartridge for simultaneous presentation of the two mediums in synchronous relationship. The film represents the sole mechanical interconnection between the motive power of the record and the light gate of the projector and the sound pickup has adjustment for longitudinal displacement for the purpose of synchronization correction.

---

This invention relates to a combined sound and visual presentation apparatus which, in a compact form, fulfills the requirement of delivering entertainment in the form of a projected motion picture with sound accompaniment.

In the field of entertainment, sound motion pictures require elaborate projection apparatus which generally utilizes a type of film which incorporates a sound track in the form of a photographic record or ferromagnetic strip.

Apparatus of this type is far too complex for handling by the average user and, by virtue of its complexity, is too costly to find ready acceptance for home use.

Prior to the photographic sound track, attempts were made to combine moving picture projection with a conventional disc record which, again, required complicated and elaborate apparatus inasmuch as two distinct units had to be mechanically interlinked in one form or another to obtain and maintain synchronization between the picture elements presented and the sound track on the record corresponding thereto.

In certain applications where relatively short subjects are to be presented, attempts have been made to combine the presentation of individual slides in a viewing apparatus with sound accompaniment on a phonograph disc, both the projector for the pictures and the sound reproducer being placed in one housing. Such a device is relatively simple to construct, inasmuch as the visual portion comprises still pictures so that each frame may be presented at a given time when the sound record, generally containing an explanatory discourse of the view presented, reaches a blank spot.

When the audio-visual presentation is to be performed by means of a compact combination projector and sound reproducer unit and, instead of still slides, it is desired to utilize a motion picture film which may be supported on a reel, the synchronization presents particular difficulties since, in the relatively small space allotted for such an apparatus, the winding of the film into the projector portion and the correlation of the sound on the disc requires handling of a skill beyond the adroitness of the average user.

In the present application, according to the invention, use is made of a compact audio-visual display cartridge in which the disc record and the reel of motion picture film are firmly secured together as an inseparable and integral unit. The film reel is of the endless, repeating type, the playing time of which is the same as that of the record. It has an extending loop portion correlated in position to the starting groove of the record with respect to the sound accompaniment. An audio-visual cartridge of this type forms the subject matter of U.S. patent application, S.N. 760,573 filed Sept. 18, 1968 in the name of Lew W. Lessler.

It is the primary object of this invention to provide a disc-sound reproducer and motion picture projector which will accept a compact audio-visual display cartridge of the type disclosed in the aforesaid application, as a unitary structure including the necessary components for the reproduction of both mediums of entertainment in a simple and efficient manner, affording ease of operation and handling.

It is a salient feature of the invention that, albeit there is no mechanical interconnection between the drive of the record reproducer and that of the motion picture projector, synchronization of the sound is maintained between the picture elements and the sound in a simple manner.

A particular advantage of the invention is that the motion picture projection portion of the assembly requires no threading, being in readiness for reproduction by the simple placement of the record of the audio-visual cartridge upon the turntable of the apparatus.

A further improvement over devices of audio-visual presentation capabilities as herein disclosed resides in the provision of a simple expedient for correction of the synchronization between the picture elements being projected and the intended sound accompaniment therefor.

Other objects, features, advantages and improvements will be apparent from the following description of the invention, pointed out in particularity in the appended claims, and taken in connection with the accompanying drawings in which:

Figure 1:
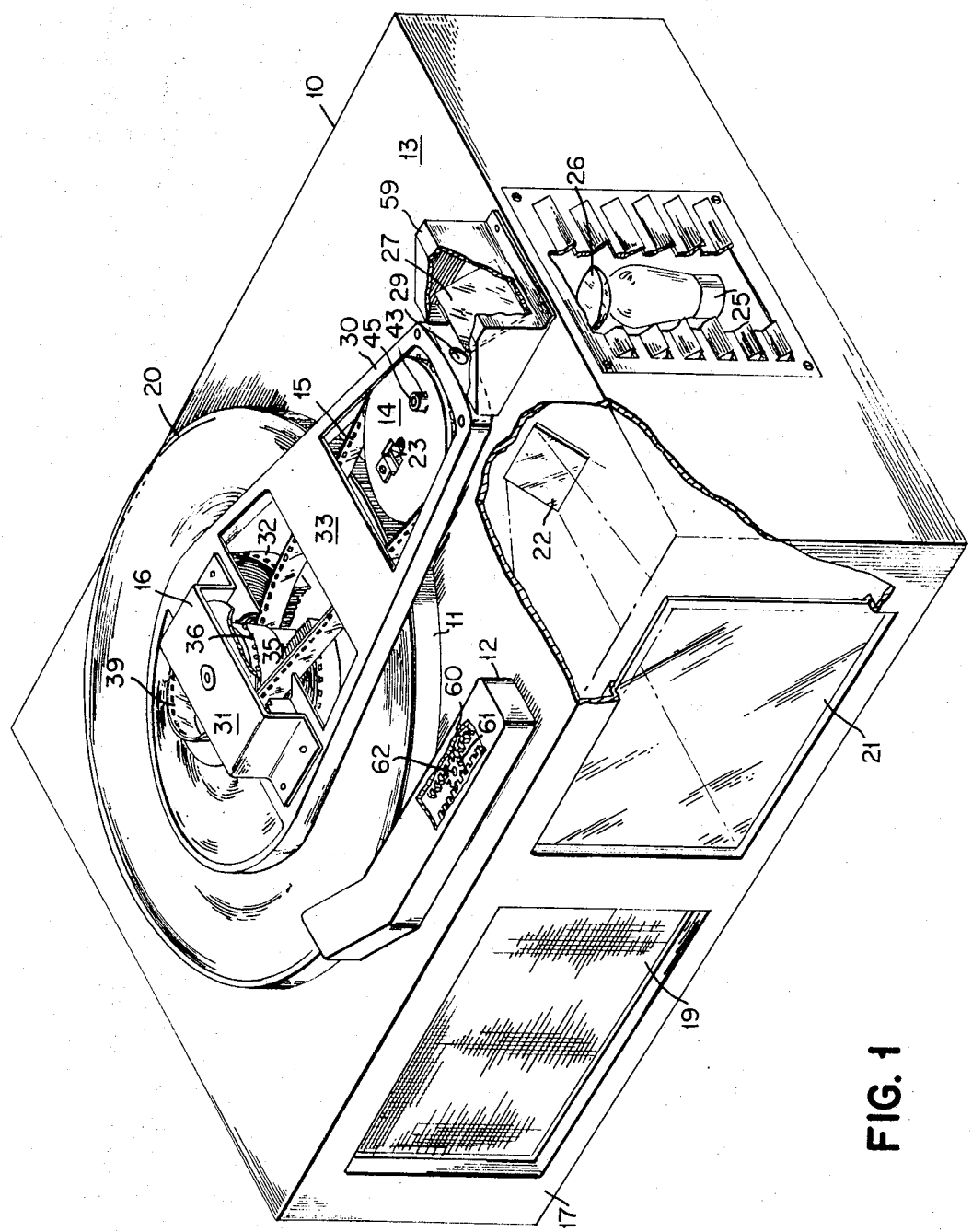
FIG. 1 is an elevational view, in perspective, and partially in section, of the projection apparatus with the disc-film cartridge placed in playing position.

Referring to the figures, as seen in FIG. 1, the audio-visual presentation apparatus comprises a casing or cabinet 10 which may be of any desired shape and of sufficient size to accommodate, on the base plate 13 thereof, a conventional phonograph turntable 11, a tone arm 12 associated therewith, and a light gate 14 which, as will be seen, is in fact the optical intermittent frame selector for the motion picture film 15. The latter is part of the audio-visual display cartridge 16 described in the aforesaid patent application.

In the front panel 17 of the cabinet 10 is seen a grille 19 behind which would be placed a speaker or sound reproducer for the phonograph. The components necessary for amplifying the sound from the record 20 and the reproducer thereof are not illustrated inasmuch as these may be of any of the conventional types well known in the art. Suffice it to say that when the pickup 12 is placed on the record 20, the sound impression thereof will be properly amplified and reproduced by the speaker behind the grille 19. A control for adjustment of the sound volume is not shown here. This may be placed anywhere at the discretion of the designer.

Next to the screen 19 and placed in front of the panel 17 is the screen 21 which, being illuminated from the back, consists of a translucent plastic or glass having a sand-blasted finish so as to display an image. In photographic terminology, this type of material is generally referred to as "ground glass."

In addition to the viewing screen 21, the cabinet 10 also accommodates component elements for furnishing light and various strategically placed mirrors so as to properly project the image on the screen 21. It is seen from the cutout portions that behind the screen 21 is an inclined mirror 22 which is in optical relation to the mirror 23 in the light gate 14. A light source in the form of a projection lamp 25 with suitable condensing lens 26 is also located within the housing and throws a beam of light onto the inclined mirror 27 which faces the opening 29 in the housing 30 of the cartridge 16. The light path between the projection lamp 25 and the screen 21 will be described in greater detail in connection with the view shown in FIG. 5.

For a thorough understanding of the apparatus and its function, a brief description will be given here of the film cartridge which forms the subject matter of the aforementioned patent application. It consists of a standard phonograph record 20, preferably of the 45 r.p.m. type, to which is solidly attached the supporting frame 31 of an endless film reel 32. This assembly is secured to an elongated oblong cover 33 which extends so that it can be placed over the light gate 14. The reel 32 has a hub 35 which has sprockets 36 (FIGS. 1 and 4) to engage the loop of the film 15 in such a manner that as the record turns the hub 35 revolves and the film 15 is constrained to move outwardly from the center portion of the reel and inwardly over the hub 35 to be wound onto the outer periphery of the reel. In this manner, and this is an important feature of the invention, the film alone, placed over the light gate 14, becomes the actuating element of the motion picture projection portion of the apparatus.

Figure 2:
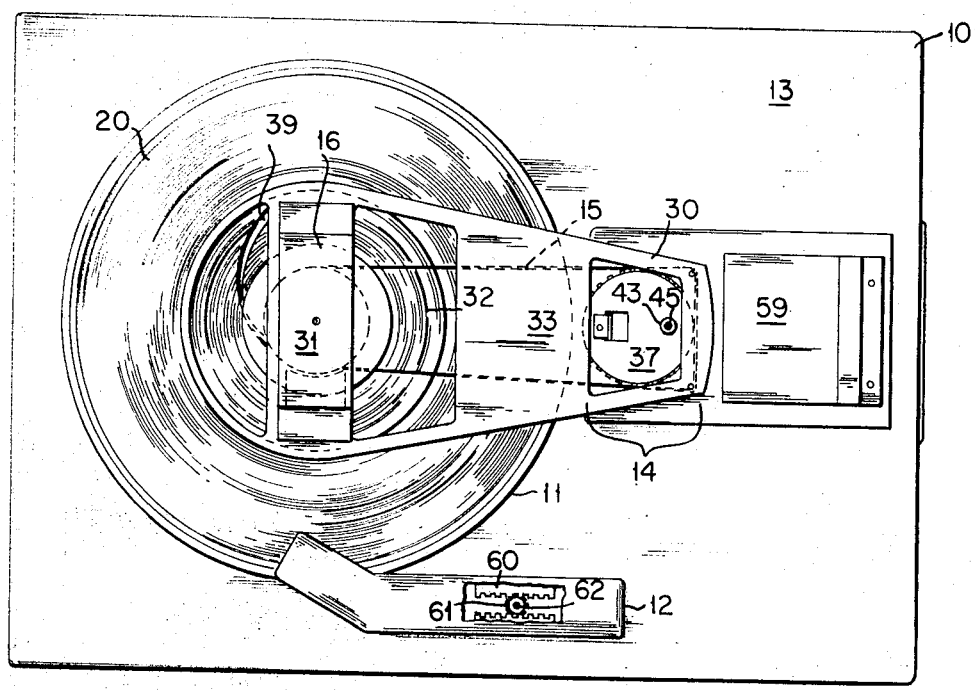
FIG. 2 is a top view of the apparatus.
Figure 3:
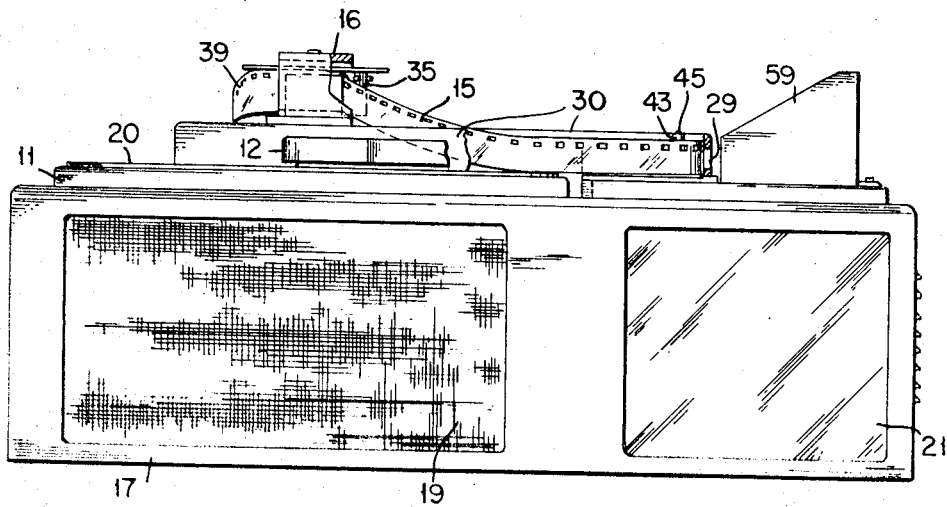
FIG. 3 is a front elevational view thereof.

The path of the film and general disposition of the component elements on top of the cabinet 10 can best be seen in FIG. 2. The loop of the film is in peripheral engagement with the drive gear which is within the housing 37 of the light gate 14. In the front elevational view in FIG. 3, portions of the cover of the cartridge 16 have been removed to show the film 15 leaving the light gate drive and entering around the hub 35 and forming a film return spiral 39 which becomes the outer portion of the film reel 32. Endless film reels are old in the art and various types may be employed as long as the rotation of the hub 35 provides for the exit of the film from one part and the entrance thereof in another part due to the rotating motion of the hub. Since the latter is solidly attached to the sound record 20, it is evident that there is a fixed relation between the rotating motion thereof and the in-and-out feed of the film loop.

Figure 4:
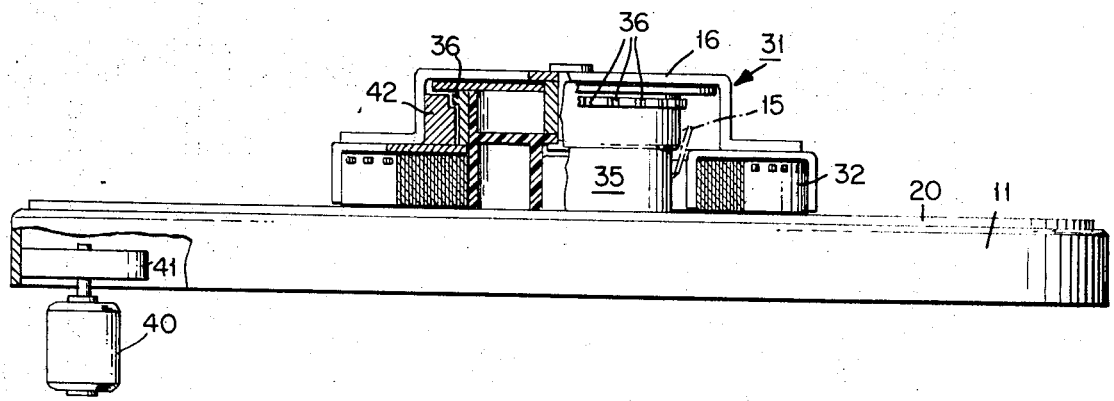
FIG. 4 is a partial sectional view of the turntable and film cartridge assembly.

In FIG. 4 it is shown, by way of example, that the turntable 11 has for its motive power a motor 40 which has a friction wheel 41 engaging the inner periphery of the turntable 11. Other types of drives may be employed of course without departing from the essential operation of the invention. For a better understanding of the operation, portions of the cover of the film reel have been cut away. The view is taken looking in the direction from the light gate 14. The outfeed of the film 15 is shown as it leaves the center of the reel; the infeed is to be visualized as being between the guide 42 and sprocket 36 of the hub 35.

Figure 5:
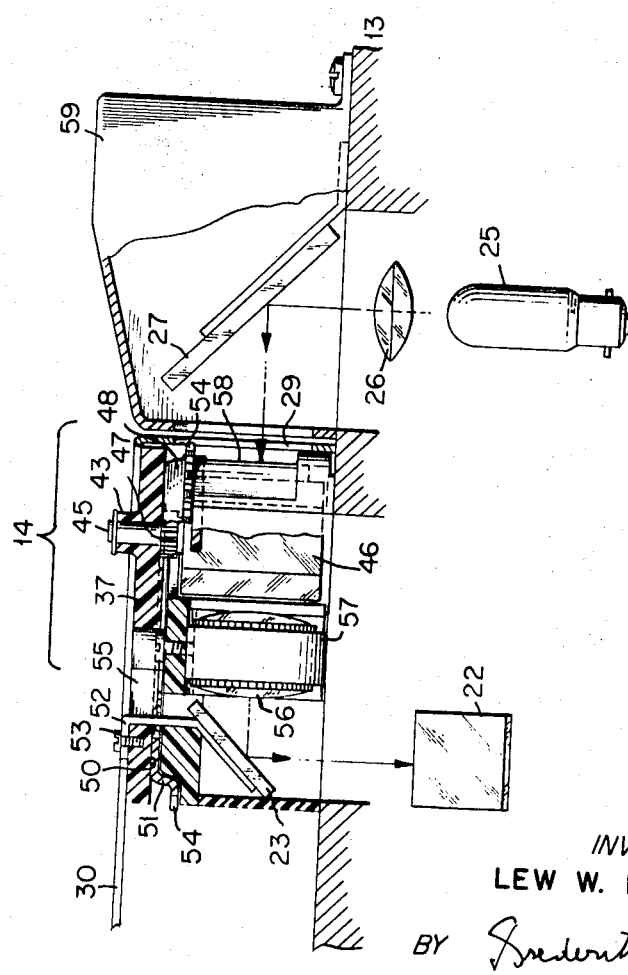
FIG. 5 is a front elevational view, in section, of the light gate and associated components for film projection.

The salient feature of the projection portion of the audio-visual presentation apparatus, in accordance with the invention, is illustrated in FIG. 5. It is referred to as the light gate 14 inasmuch as it performs the intermittent projection of a continuously-moving motion picture film. In the embodiment shown in FIG. 5, it consists of a housing 37 which has a vertically-extending bearing portion 43 in which is rotatably supported the shaft 45 of a multi-faceted prism 46. A gear 47 attached to the shaft 45 engages a ring gear 48 which rides in a dished-out portion 50 of the housing 37. For this purpose, the ring gear 48 has a shoulder 51 which fits in the space provided by the portion 50. The inner teeth 49 of the gear 48 engage the gear 47, whereas the outer face thereof extends slightly from the housing 37 and is provided with sprockets 54 so distributed as to properly engage the film loop which, as seen in FIGS. 1 and 2, surrounds the housing 37. The bottom of the housing 37 is open and communicates with the inside of the cabinet 10. The mirror 23 is supported in a slot 55 in the housing 37 by means of a bracket 52 and fastening means 53. A projection lens 56 is supported in a holder 57 which may be part of the housing 37 or may be affixed thereto in any desired manner.

In line with the facets of the prism 46, the housing 37 is provided with a cutout 58. The latter is in front of the reflecting mirror 27 which faces the light source or lamp 25.

Thus the optical path from the light source 25 to the screen 21 comprises the lens 26; the mirror 27; the prism 46; the lens 56; and the mirrors 23 and 22. When the film cartridge is on the turntable 11, the loop wound around the housing 37 places the picture elements of the film over the cutout 58 so that the light must pass through the film in order to reach the screen 21. A cover 59 is provided over the mirror 27 to prevent the light from being seen by the film viewer.

Figure 7:
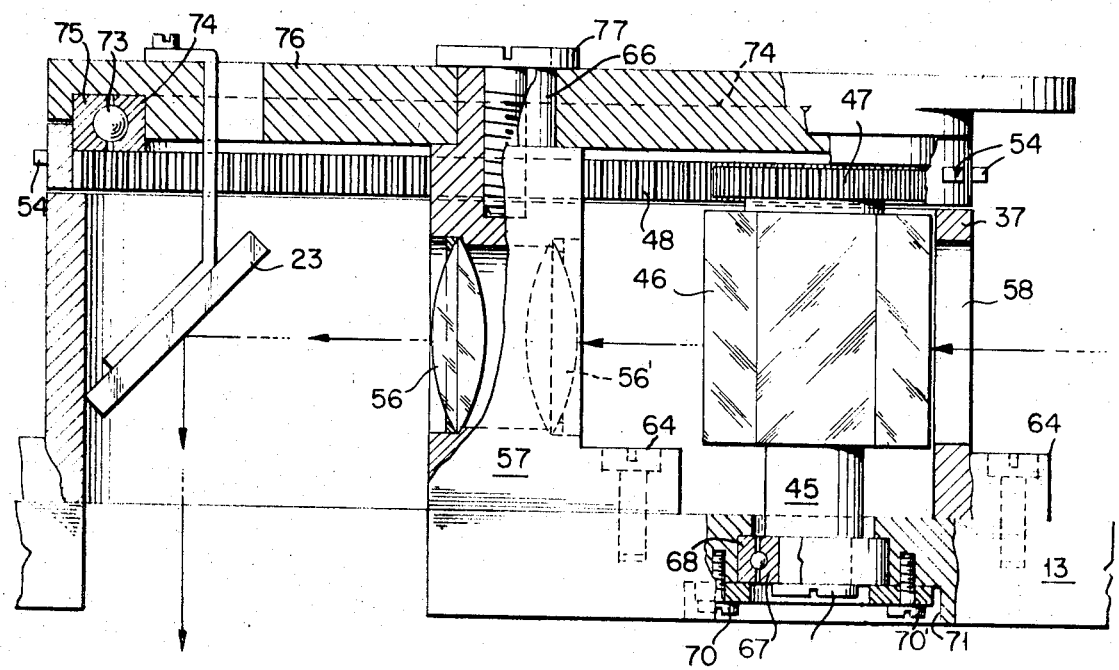
FIG. 7 is an enlarged cross-sectional view of a modified light gate construction which may be used in place of the one shown in FIG. 5.
Figure 6:
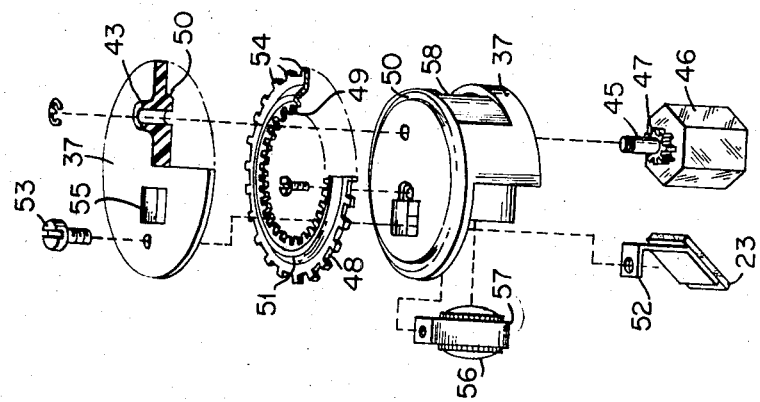
FIG. 6 is an exploded view showing the relationship of the component elements of the light gate.

The modified light gate construction shown in FIG. 7 is identical in function to the one described in connection with FIG. 5 and corresponding parts bear identical reference characters. The housing 37 is attached to the base plate 13 by means of suitable bolts 64 together with an inner supporting member 57 which extends upwardly and terminates in a stud portion 66. The member 57 accommodates the projection lens assembly consisting of lenses 56 and 56'.

The shaft 45 of the prism 46 is retained in a ball bearing 67, the outer race 68 of which is secured to the base plate 13 by means of screws 70 and 70' which are accommodated in a cutout 71 in the base plate 13. As seen in this modification, the mirror 46 is in an upright position and carries at the other end thereof, the drive gear 47. The ring gear 48 is supported in roller bearings 73 of which the inner race 74 is attached to the gear 48; whereas the outer race 75 is attached to the cover 76 which is secured over the stud 66 by means of the retaining bolt 77. The outer face of the gear 48 has the required sprockets 54 for the passing of the film over the cutout 58.

The above-described construction assures a more rigid mechanical assembly and, by virtue of the ball bearing supports of the moving elements, contributes to the more exacting requirement of smooth projection of the frames of the motion picture film.

Referring to the operation of the presentation apparatus, as the turntable is rotated, the film 15 is constrained to move in and out of the cartridge 16 and, being in engagement with the sprockets 54, it rotates the ring gear 48 which, in turn, causes rotation of the prism 46. When corresponding facets of the prism are in line with the lens 57 and the cutout 58, the properly illuminated picture element is projected on the screen 21. As the motion continues, each time the prism 46 is in such a position that the edges of its facets are in line between the lens 56 and the cutout 58, the light path is interrupted so that, at that instant, no light is projected on the lens 56 and, consequently, no light may reach the screen 21. In this manner, the continuous motion of the film 15 is converted into an intermittent projection of picture elements without in any way requiring intermittent motion of the film itself.

It has been pointed out that the film cartridge and the phonograph record form a unitary structure. In the manufacture thereof these components are so correlated that the film loop extending therefrom is the start of the picture and the record starting groove is in a proper position for the pickup. The picture elements over the light gate thus correspond to the beginning of the sound accompaniment of the record 20. The length of the film reel corresponds also to the playing time of the record. Consequently, synchronization between the picture presented and the record is automatically maintained. However, in order to obtain more exact synchronization, especially when, in the presentation, the movement of the lips of the person must be synchronized to the sound on the record, further compensation may be had by permitting longitudinal adjustment of the tone arm 12. As seen in FIGS. 1 and 2, this is accomplished by providing the tone arm 12 with rack interfaces 60 in engagement with pinion 61 which has a knob 62. By turning the latter, the tone arm 12 may be displaced in a manner of a Vernier adjustment to allow the needle slight forward or rearward motion, thereby obtaining synchronization correction between the two display mediums.

This invention in its broader aspects is not limited to the specific embodiment herein shown and described but departure may be made therefrom within the scope of the accompanying claims, without departing from the principles of the invention and without sacrificing its chief advantages.

What is claimed is:

1. In an audio-visual presentation apparatus, in combination, a turntable accommodating a disc record having sound impressions, motive power for driving said turntable and a sound pickup adapted to be in contact with said record, and reproducing components associated therewith, said disc record having a motion picture film reel of the endless, repeating type attached thereto, said reel having a loop of film extending therefrom, a projection system having a screen, a light source and a rotatable intermittent optical shutter adapted to engage said loop, said film being the mechanical interlinkage between said turntable and said shutter for the rotation thereof.

2. Apparatus in accordance with claim 1 wherein said optical shutter comprises a rotatable prism in the path of said light source, having a plurality of facets each defining an area substantially equal to the frame area of individual picture elements of said film, said prism being freely rotatable and independent from said motive power.

3. Apparatus in accordance with claim 1 wherein said shutter comprises a support housing having a base, a bearing in said base accommodating one end of the shaft supporting a prism, a pinion at the other end of said shaft, a ring gear having sprockets on the outer surface thereof accommodating the perforations of said film, and gear teeth on the inner surface meshing with said pinion, a bearing in said housing supporting said ring gear, and a light aperture in the side of said housing facing said prism for the illumination of the picture elements of said film, and optical means for the focusing and projection of said picture elements onto said screen.

4. Apparatus in accordance with claim 1 wherein said sound pickup comprises a tone arm having a needle for the engagement of the grooves of said record, said arm being swingably supported for following the grooves over said record and means for allowing longitudinal displacement of said arm in the direction forward or rearward for the adjustment of synchronization between the sound and the projected picture elements.

References Cited

UNITED STATES PATENTS 2,378,416  6/1945  Like _____ 352—32
3,161,106  12/1964  Lang, Jr. _____ 352—208X DONALD D. WOODIEL, Primary Examiner U.S. Cl. X.R.

352—208